A. S. Winchester
Pulp Strainer
Nº 87,385.  Patented Mar. 2, 1869.

Witnesses.
S. N. Piper.
J. R. Snow

Inventor.
A. S. Winchester
by his attorney.
R. H. Eddy

UNITED STATES PATENT OFFICE.

ARTHUR S. WINCHESTER, OF BOSTON, MASSACHUSETTS, ASSIGNOR TO HIMSELF AND JAMES S. PARSONS, OF SAME PLACE.

IMPROVED METALLIC SCREEN FOR PAPER-PULP.

Specification forming part of Letters Patent No. 87,385, dated March 2, 1869.

*To all persons to whom these presents may come:*

Be it known that I, ARTHUR S. WINCHESTER, of Boston, in the county of Suffolk and State of Massachusetts, have made a new and useful invention having reference to metallic-plate screens for screening paper-pulp; and I do hereby declare the same to be fully described in the following specification, the accompanying drawings exhibiting a screen of the kind described—

Figure 1:
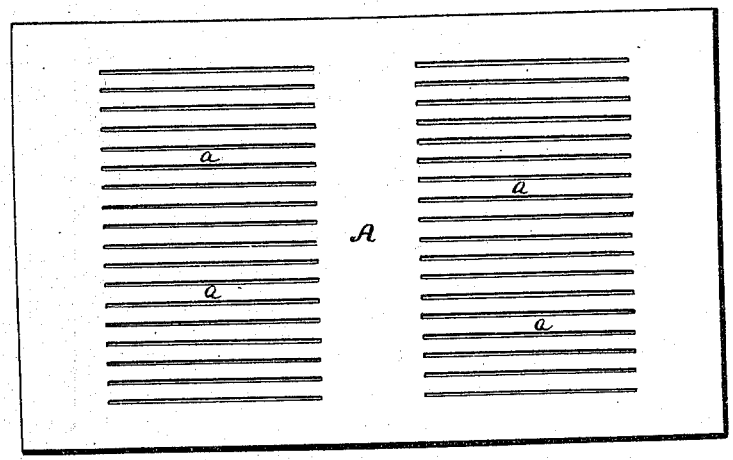
Figure 2:
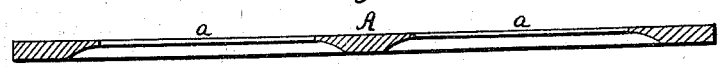
Figure 3:
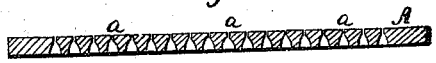
Figure 4:
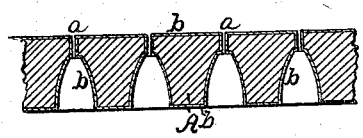

Figure 1 being a top view, Fig. 2 a longitudinal section, and Fig. 3 a transverse section, of it. Fig 4 is a section, on an enlarged scale, of a part of the plate, showing two or more of the slits with the plating applied to them and the external surfaces of the plate.

These screens, as heretofore made, have had their slits formed by means of one or more saws. A great difficulty has arisen in getting the slits sufficiently narrow, as the saw, to operate, must have a thickness which will prevent it from unduly springing while cutting the plate. In consequence of this the fineness or width of the openings of the screen has been practically limited, and, as a general thing, has been much wider than it was desirable to have it.

In carrying out my process of making a screen, I have combined the process of sawing or cutting with a tool and that of electroplating—that is to say, I first make the slits in the plate by means of a saw or saws, or other proper tool or tools, preferring a circular saw for such purpose, after which I immerse the plate in a solution of an electroplating bath, and by means of the circuit-wires and battery thereof deposit on the plate and the inner edges of each of the slits a stratum of metal, such as nickel, for instance, when the plate is of iron or copper. The deposit of the metal can be carried on until each of the slits may be reduced to the requisite fineness or width, which cannot be attained in any other way so perfectly as by the said electroplating process. The metal deposited on the plate may be such as will resist oxidation to greater advantage than the metal of the plate. Thus the inner edges of the slits may be protected from oxidation and wear and the slits from filling up or being more or less interrupted thereby.

In the drawings, the slits are shown at *a a a* and the plate at A, the metallic lining or deposit being represented at *b*.

I do not claim the process of sawing or making the slit by a tool, nor that of electroplating, when separately considered; but What I do claim is—

1. The new or improved manufacture of paper-pulp screen, in which the sides of the slits are protected and the slits reduced in width by means of layers of metal deposited on them, by means as set forth.

2. Also, the process of making the slitted pulp-screen—viz., by sawing or making each of its slits by a tool or saw, and subsequently depositing on the opposite sides of such slit, or on the same and the external surface or surfaces of the metallic plate, a metallic plating, by means of an electroplating bath and its current and battery, as set forth.

ARTHUR S. WINCHESTER.

Witnesses:
R. H. EDDY,
F. P. HALE, Jr.